United States Patent
Yezerets et al.

(10) Patent No.: US 9,724,685 B2
(45) Date of Patent: Aug. 8, 2017

(54) SOLID STORAGE MEDIA CHARGING WITH AMMONIA FOR USE IN SELECTIVE CATALYTIC REDUCTION

(71) Applicant: Cummins Inc., Columbus, IN (US)

(72) Inventors: Aleksey Yezerets, Columbus, IN (US); Neal W. Currier, Columbus, IN (US); Timothy R. Frazier, Columbus, IN (US); Andrew W. Osburn, Nashville, IN (US); Krishna Kamasamudram, Columbus, IN (US)

(73) Assignee: Cummins Inc., Columbus, IN (US)

( * ) Notice: Subject to any disclaimer, the term of this patent is extended or adjusted under 35 U.S.C. 154(b) by 485 days.

(21) Appl. No.: 14/288,526

(22) Filed: May 28, 2014

(65) Prior Publication Data

US 2014/0271389 A1    Sep. 18, 2014

Related U.S. Application Data

(63) Continuation of application No. PCT/US2012/066748, filed on Nov. 28, 2012.

(60) Provisional application No. 61/566,204, filed on Dec. 2, 2011.

(51) Int. Cl.
| B01D 53/90 | (2006.01) |
| B01J 38/08 | (2006.01) |
| B01D 53/94 | (2006.01) |
| F01N 3/20 | (2006.01) |

(52) U.S. Cl.
CPC ............ *B01J 38/08* (2013.01); *B01D 53/90* (2013.01); *B01D 53/94* (2013.01); *B01D 53/9409* (2013.01); *F01N 3/2066* (2013.01); *B01D 2251/2062* (2013.01); *F01N 2610/02* (2013.01); *F01N 2610/06* (2013.01); *F01N 2610/10* (2013.01); *F01P 2060/18* (2013.01); *Y02T 10/24* (2013.01)

(58) Field of Classification Search
CPC ...................................... B01D 53/90–53/9409
See application file for complete search history.

(56) References Cited

U.S. PATENT DOCUMENTS

| 4,342,200 | A | * | 8/1982 | Lowi, Jr. ............ B60H 1/00007 417/191 |
| 5,809,775 | A | | 9/1998 | Tarahulski et al. |
| 6,387,336 | B2 | | 5/2002 | Marko et al. |
| 6,838,069 | B2 | | 1/2005 | Blonigen et al. |
| 7,178,329 | B2 | | 2/2007 | Bertiller et al. |
| 7,497,076 | B2 | | 3/2009 | Funk et al. |

(Continued)

FOREIGN PATENT DOCUMENTS

| EP | 0 932 440 B1 | 6/1998 |
| WO | 2010025947 A1 | 3/2010 |
| WO | 2010025948 A1 | 3/2010 |

OTHER PUBLICATIONS

International Search Report and Written Opinion, ISA/US, PCT2012/066748, Cummins Inc., Feb. 5, 2013, 12 pgs.

(Continued)

*Primary Examiner* — Colleen Dunn
(74) *Attorney, Agent, or Firm* — Taft Stettinius & Hollister LLP

(57) ABSTRACT

There is disclosed method and systems for charging a depleted or spent solid storage media with gaseous ammonia.

15 Claims, 4 Drawing Sheets

(56) References Cited

U.S. PATENT DOCUMENTS

| | | | |
|---|---|---|---|
| 2003/0172809 A1* | 9/2003 | Speth | B01D 53/04 |
| | | | 95/128 |
| 2009/0123361 A1 | 5/2009 | Johannessen et al. | |
| 2009/0280047 A1 | 11/2009 | Christensen et al. | |
| 2009/0313976 A1 | 12/2009 | Johannessen et al. | |
| 2010/0024403 A1 | 2/2010 | Johannessen et al. | |
| 2010/0050615 A1 | 3/2010 | Johannessen et al. | |
| 2010/0062296 A1 | 3/2010 | Johannessen et al. | |
| 2010/0242928 A1* | 9/2010 | Fasold | B01D 53/40 |
| | | | 123/568.12 |
| 2011/0236294 A1 | 9/2011 | Svagin et al. | |
| 2011/0284121 A1 | 11/2011 | Johannessen et al. | |

OTHER PUBLICATIONS

International Application No. PCT/US2012/066748, International Preliminary Report on Patentability, Jun. 3, 2014, 8 pages.

\* cited by examiner

SOLID STORAGE MEDIA CHARGING WITH AMMONIA FOR USE IN SELECTIVE CATALYTIC REDUCTION

CROSS-REFERENCE TO RELATED APPLICATIONS

The present application is a continuation of PCT/US2012/066748 filed on Nov. 28, 2012, which claims the benefit of the filing date of Provisional Application No. 61/566,204 filed on Dec. 2, 2011, each of which is incorporated herein by reference in its entirety.

BACKGROUND

The present application relates to solid storage media for ammonia, and more particularly, but not exclusively, to methods and systems for charging of solid storage media with ammonia for use in selective catalytic reduction.

Solid materials for ammonia storage have been developed as a source of reductant in selective catalytic reduction (SCR). By dosing gaseous ammonia from solid storage media, the SCR system is capable of working at temperatures below the current limits of traditional urea-based SCR systems. Solid media storage systems for ammonia also operate without the negative aspects associated with urea-derived deposit problems in the exhaust system.

Current solid media storage systems for ammonia are primarily based on using inorganic salts including alkaline-earth metal chloride salts, such as $SrCl_2$ or $MgCl_2$, as a storage media to absorb and release ammonia. The storage media is charged with ammonia by exposing the storage media in powder form to gaseous ammonia to slowly saturate the salts, and then compressing the saturated salts into high-density storage media elements. In use, the solid storage media is placed in cartridges mounted in the exhaust system and the ammonia is released by applying heat to the storage media in the cartridge.

Absorption of ammonia in metal chloride salts is a highly exothermic process. For example, in the case of $SrCl_2$, the process produces 41 kJ/mol of stored ammonia (SAE 2009-01-0907). This amounts to a very large (thousands ° C.) temperature increase unless the evolving heat is removed from the storage media or compensated by another endothermic process. When the storage media is spent of ammonia, charging of the storage media is accomplished by saturation of the spent storage media using liquid anhydrous ammonia such that the heat required for ammonia vaporization would, to some degree, offset the heat produced by the ammonia reaction with the storage media. However, large amounts of heat are still generated. Thus, the charging process is accomplished by removing the spent storage media elements and/or the cartridge of spent elements from their application and processing them at a remote location due to safety and handling concerns for the liquid ammonia. Spent cartridges may also be removed and rebuilt using new or recycled storage media.

These re-charging options for spent cartridges have limited viability due to the heat that is generated and the complexity and cost associated with handling anhydrous ammonia. Furthermore, the cost associated with re-building cartridges with new or recycled storage media can be relatively high. Without the capability to re-charge the storage media inexpensively and/or at a dealership or service center, the economic viability of the solid storage media technology for ammonia may be limited. Thus, there remains a need for further contributions in this area of technology.

SUMMARY

One embodiment of the present invention is a method for charging a depleted or spent solid storage media with ammonia. Other embodiments include unique methods, systems, devices, and apparatus involving charging spent solid storage media with ammonia. Further embodiments, forms, objects, aspects, benefits, and advantages of the present invention shall become apparent from the figure and description provided herewith.

DETAILED DESCRIPTION OF REPRESENTATIVE EMBODIMENTS

Figure 1:
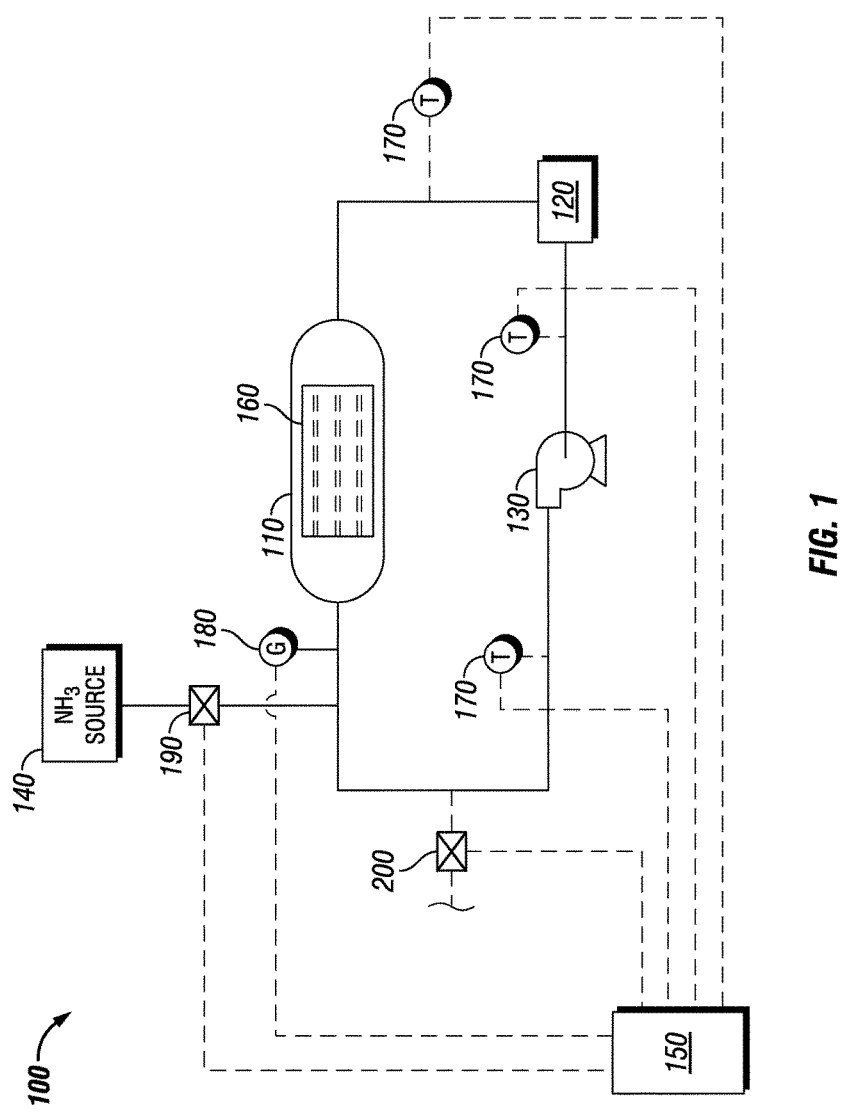
FIG. 1 is a diagram showing a system for charging a solid storage media with ammonia according to one embodiment.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Solid storage media for ammonia provide a source for reductant in selective catalytic reduction (SCR) processes. The volumetric density of ammonia storage in a compressed salt media is similar to liquid ammonia and is ~3 times higher than in a urea solution. Ammonia may be absorbed by producing a solid storage media with certain inorganic salts, such as chlorides of alkaline-earth metals (e.g., $MgCl_2$, $CaCl_2$, $SrCl_2$) or metal ammine complexes. These complexes may be represented by $M_a(NH_3)_nX_z$ where "M" may include Li, Mg, Ca, Sr, V, Cr, Mn, Fe, Co, Ni, Cu, Zn etc. and "X" may include F, Cl, Br, I, $SO_4$, $MoO_4$, $PO_4$ etc. The storage media is "charged" by exposing the metallic salt to ammonia. The rate of charging the storage media may be increased by processing at high pressures (several bars). Ammonia is "discharged" from the storage media by applying heat (~40-90 kJ/mol $NH_3$, depending on the storage media). The charging and discharging processes are reversible and may be repeated many times.

Methods and systems are disclosed herein for charging a solid storage media with ammonia without generating excessive heat or requiring the complex safety measures typically required for handling anhydrous ammonia. It is contemplated that such charging may be readily conducted at, for example, dealerships and/or service stations, decreasing the cost and time associated with dealing with cartridges containing spent solid storage media.

One embodiment includes a charging process that is conducted under controlled temperatures where the spent storage media is charged in the cartridge with ammonia by passing dilute ammonia gas through the storage media. The process using dilute ammonia gas includes controlling the rate of heat evolution using high flow rates of a carrier gas containing a limited concentration of ammonia. The process of charging the storage media may be controlled by limiting the flux of ammonia gas and by the efficiency of the cooling action.

An example of a respective embodiment is shown in FIG. 1. A charging system 100 includes a media storage cartridge 110 containing spent solid storage media 160. Dry warm carrier air moves from cartridge 110 to a cooler 120. Cool dry carrier air then moves from cooler 120 to a compressor 130. The compressed cool dry carrier air re-enters cartridge 110. Prior to the compressed cool dry carrier air entering cartridge 110, a source 140 of gaseous ammonia is operated to inject or deliver ammonia gas into the airflow of the carrier air. The compressed cool dry carrier air cools the storage media 160 in cartridge 110 while the solid storage media 160 is charged with ammonia by the ammonia gas carried by the carrier air entering cartridge 110.

System 100 with ammonia source 140 can be provided at, for example, service stations and/or dealerships, or transported to the application utilizing cartridge 110. System 100 is connected to cartridge 110 when it is desired to charge storage media 160. Prior solutions for charging of storage media 160 with anhydrous ammonia result in complications arising from the competition of water with ammonia for storage in the metal chlorides of solid storage media 160. In addition, handling of anhydrous ammonia presents a number of challenges with regards to safety, cost, training, and other issues.

In one embodiment, ammonia source 140 provides water-free ammonia that may be derived from the decomposition of various materials which contain ammonia in a bound form, such as urea or ammonium salts including ammonium carbamate, ammonium carbonate, ammonium bicarbonate, and ammonium acetate, for example. In one embodiment, a solid compound such as ammonium carbamate may be decomposed to yield $NH_3$ and $CO_2$. The resulting gas stream may be used directly for storage media charging since $CO_2$ is not known to compete with ammonia for storage. Alternatively, $NH_3$ and $CO_2$ may be separated, for example using methods employing separating membranes.

Further embodiments of the system of FIG. 1 include, but are not limited to, various sensors to control process parameters for charging storage media 160 with a controller 150. In the illustrated embodiment, system 100 includes one or more temperature sensors 170 located at certain locations in system 100. For example, temperature sensors 170 can be positioned to measure the temperature of the warmed carrier air exiting cartridge 110, the temperature of the cooled carrier air exiting cooler 120, and the temperature of the cooled carrier air exiting compressor 130. Furthermore, a gas composition sensor 180 can be provided downstream of the inlet of gaseous ammonia into the carrier air to indicate the air flow composition to cartridge 110, including, but not limited to, $NH_3$ concentration.

Furthermore, an ammonia gas control valve 190 can be provided from source 140 upstream of the inlet to the carrier air. Control valve 190 is operable to control the flow rate or quantity of ammonia gas delivered to the carrier air of system 100. A carrier air exhaust valve 200 can be provided to exhaust all or a portion of the carrier air control an amount of carrier air provided to cartridge 110 of system 100. As discussed further below, control valves 190, 200 are operable with controller 150 to control the flow rate of carrier air to cartridge 110 and/or the concentration of ammonia gas in the carrier air to cartridge 110 to provide the appropriate charging conditions for the storage media 160 contained in cartridge 110 and control the heat generated by charging storage media 160 based on signals provided by sensors 170, 180.

Figure 2A:
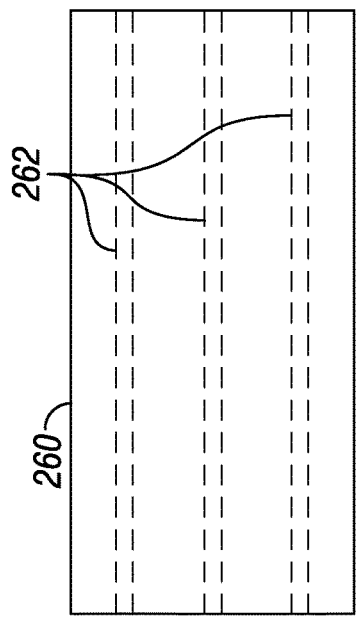
FIGS. 2A and 2B are diagrams of another embodiment of a solid storage media for storing ammonia.
Figure 3A:
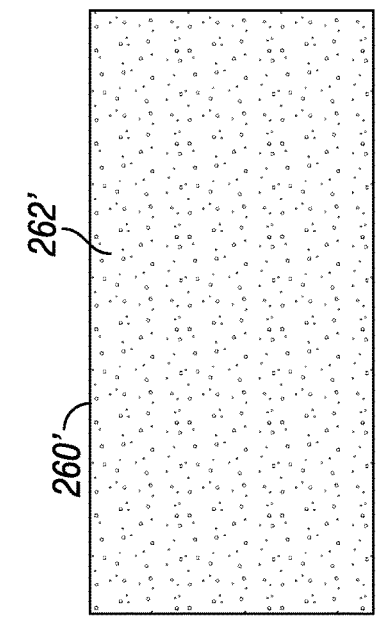
FIGS. 3A and 3B are diagrams of another embodiment of a solid storage media for storing ammonia.
Figure 2B:
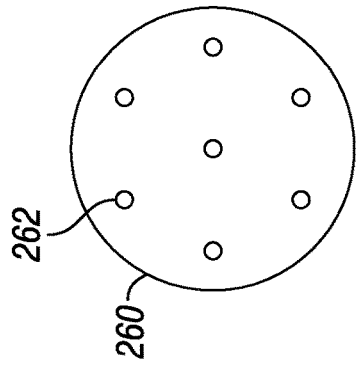
Figure 3B:
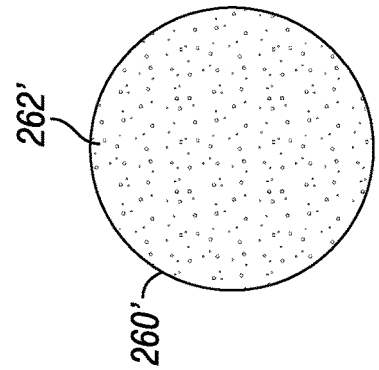

Storage media 160 can be any solid storage media for storage of ammonia and subsequent release to, for example, an SCR system. As shown in FIGS. 2A and 2B, an improved storage media 260 includes a number of channels 262 extending therethrough. Channels 262 provide a distribution of the carrier gas flow throughout the interior of storage media 260 to enhance heat transfer from the storage media 260 to the carrier gas and mass transfer of the gaseous ammonia to the storage media 260. In another embodiment shown in FIGS. 3A and 3B, the storage media 260' includes a porous structure with a number of pores 262' to enhance heat transfer from the storage media 260' to the carrier gas and mass transfer of the gaseous ammonia to the storage media 260'. Other embodiments contemplate storage media with a combination of porous material and channels. As used herein, storage media 160 includes storage media 260, 260' in addition to other forms of storage media.

Figure 4:
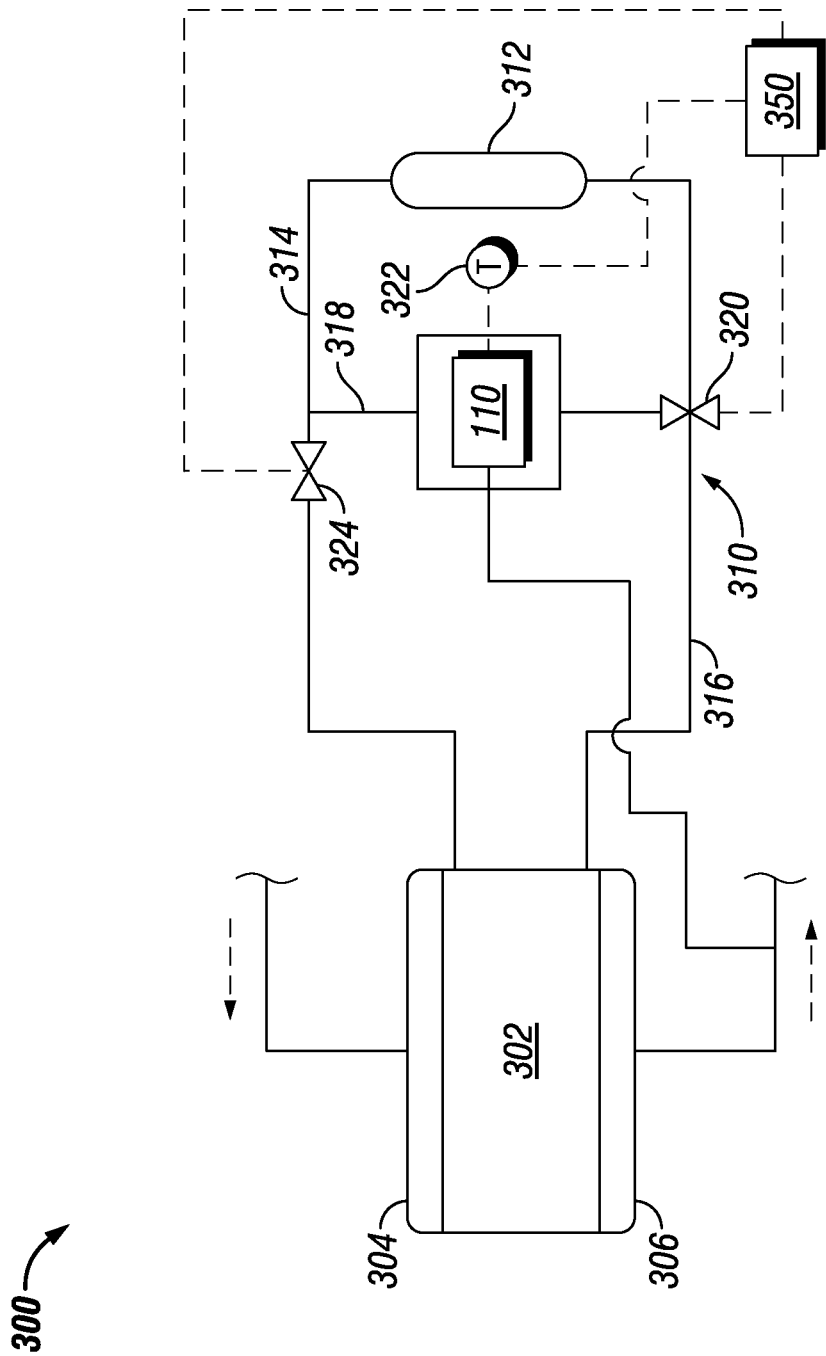
FIG. 4 is a diagram showing a system for cooling a solid storage media cartridge during charging of the solid storage media with ammonia according to one embodiment.

Referring to FIG. 4, another embodiment system 300 is shown for controlling temperatures during a charging process that can be used in lieu of or in addition to the system 100, includes providing outside cooling to the storage media 160 while the storage media 160 is charged in the cartridge 110. System 100 generally employs outside cooling by using the existing structures provided for engine coolant to cool an engine 302. System 300 is illustrated schematically and may be included with a car, truck, bus, boat, recreational vehicle, construction equipment or any other type of vehicle. Other embodiments include an engine provided in non-vehicular applications such as a generator set.

Engine 302 typically includes an intake system 304, an exhaust system 306, and other components that make engine 302 operable and that are operated by engine 302. System 300 also includes a cooling system 310 that is operable to maintain engine 302 within acceptable operating temperatures. Cooling system 310 includes a heat exchanger 312 connected to a cooling fluid outlet 314 that delivers a cooled cooling fluid to engine 302 and a cooling fluid inlet 316 that receives heated cooling fluid from engine 302 and delivers the heated cooling fluid to heat exchanger 312.

System 300 further includes a storage media cooling loop 318 that connects storage media cartridge 110 to cooling fluid outlet 314 and cooling fluid inlet 316. Furthermore, storage media cartridge 110 is connected with exhaust system 306 to provide ammonia for treatment of emissions in, for example, an SCR device of an aftertreatment system of exhaust system 306. Cooling loop 318 is connected to cooling fluid inlet 316 with, for example, a control valve 320 that is operable to selectively control a flow of cooling fluid to cartridge 110 via control signals from controller 350. Control valve 320 can be a three-way valve as shown, or a two-way valve placed in cooling loop 318. The flow of heated cooling fluid to cartridge 110 can be initiated and regulated based on, for example, a demand for release of ammonia from the solid storage media 160 in cartridge 110. During operation of engine 302, when a demand for ammonia exists, at least a portion of the heated cooling fluid flows from cooling fluid inlet 316 around the cartridge 110 to provide heat to release ammonia from the storage media 160 stored in cartridge 110.

In system 300, charging of the storage media 160 with, for example, ammonia source 140 either alone or in combination with system 100, is facilitated by a flow of cooled cooling fluid around cartridge 110 via cooling loop 318 to remove heat from cartridge 110 that develops during charging of the storage media 160. The flow of cooled cooling fluid flow from heat exchanger 312 can be initiated and regulated by temperature signals from temperature sensor 322 connected to cartridge 110 and controller 350. In this mode of operation, a second valve 324 in cooling outlet 314 can be closed or regulated to substantially direct the flow of cooled cooling fluid from cooling outlet 314 to cooling loop 318 and cartridge 110 to receive the heat created by charging of the storage media 160. Control valve 320 can be manipulated so that the heated cooling fluid is directed to heat exchanger 312, cooled, and re-circulated through cooling loop 318.

Yet another embodiment for controlling temperatures of cartridge 110 during a recharging process, either in lieu of or in addition to cooling with the engine cooling system, includes balancing heat reactions by displacing other stored molecules, e.g. $H_2O$, from the storage media 160. In one embodiment using stored water molecules, the heat of desorption of $H_2O$ is used to off-set the heat of ammonia adsorption by the storage media. In this method, the storage media 160 in a spent cartridge 110 is allowed to slowly saturate with $H_2O$ by, for example, exposing it to the atmosphere. Subsequently, exposing the storage media 160 to a dry gas containing ammonia allows for displacement of the adsorbed water by the ammonia.

In certain embodiments, systems 100, 300 include a controller 150, 350 which functionally executes certain operations for charging storage media 160 with ammonia and for cooling cartridge 110 during charging. Controller 150, 350 forms a portion of a processing subsystem including one or more computing devices having memory as well as a number of inputs and outputs for interfacing with various sensors and systems of the respective system 100, 300. Controller 150, 350 can be an electronic circuit comprised of one or more components, including digital circuitry, analog circuitry, or both. Controller 150, 350 may be a single device or a distributed device. Controller 150, 350 may include one or more control algorithms defined by operating logic in the form of software instructions, hardware instructions, firmware instructions, dedicated hardware, or the like.

In one form, controller 150, 350 is of a programmable microcontroller solid-state integrated circuit type that includes memory and one or more central processing units. The memory of controller 150, 350 includes of one or more components and can be of any of volatile or nonvolatile, solid-state, optical media, magnetic media, combinations of these, or other types of memory. Controller 150, 350 can include signal conditioners, signal format converters (such as analog-to-digital and digital-to-analog converters), limiters, clamps, filters, and the like as needed to perform various control and regulation operations described herein. Controller 150, 350 in an exemplary embodiment, may be a type of controller sometimes referred to as an electronic or engine control module (ECM), electronic or engine control unit (ECU) or the like, that is directed to the regulation and control of engine operation. Alternatively, controller 150, 350 may be dedicated to the control of just the operations described herein or to a subset of controlled aspects of the respective system 100, 300.

Controller 150 is in operative communication with temperature sensors 170 and composition sensor 190 which provides controller 150 with information indicative of the temperature of the carrier air and composition of the carrier air. Controller 350 may also be in operative communication with one or more temperature sensors 322 that indicate temperature of the cartridge 110. In other embodiments, information from temperature sensors, flow sensors, pressure sensors, and composition sensors in various locations is utilized to determine information indicative of the conditions of storage media 160 and cartridge 110 during charging.

Controller 150 is operable to determine an appropriate flow rate of carrier air and/or composition of the carrier entering cartridge 110. If a change in carrier air flow is desired, controller 150 is configured to send control signals to operate exhaust valve 200 to increase or decrease the quantity of carrier air entering cartridge 110. Furthermore, if the concentration of ammonia gas in the carrier air entering cartridge 110 needs to be increased or decreased to achieve a desired concentration for charging or to respond to a flux in the ammonia concentration, controller 150 is configured to send control signals to control valve 190 to increase or decrease the amount of ammonia gas injected into the carrier air.

Controller 350 is operable to control the flow of cooling fluid around cartridge 110 during charging. Temperature sensor 322 provides a temperature signal that is analyzed by controller 350 to determine if additional or less cooling fluid flow to cartridge 110 is required to maintain cartridge 110 in acceptable temperature limits during charging. Controller 350 is configured to provide control signals to control valves 320, 324 to open and/or close valves 320, 324 as required to maintain a flow rate of cooling fluid that maintains cartridge 110 within acceptable temperature limits.

In certain embodiments, the controller 150, 350 includes one or more modules structured to functionally execute the operations of the controller 150, 350. The description herein including modules emphasizes the structural independence of the aspects of the controller, and illustrates one grouping of operations and responsibilities of the controller 150, 350. Other groupings that execute similar overall operations are understood within the scope of the present application. Modules may be implemented in hardware and/or software on computer readable medium, and modules may be distributed across various hardware or software components. Furthermore, controllers 150, 350 may be a single device or separate devices.

Controller 150, 350 is in operative interconnection with various elements of system 100, 300 as illustrated in FIGS. 1 and 4 with dashed lines extending between controller 150, 350 and various elements of system 100, 300. These operative interconnections may be implemented in a variety of forms, for example, through input/output interfaces coupled via wiring harnesses, a datalink, a hardwire or wireless network and/or a lookup from a memory location. In other instances all or a portion of the operative interconnection between controller 150, 350 and an element of system 100, 300 may be virtual. For example, a virtual input indicative of an operating parameter may be provided by a model implemented by controller 150, 350 or by another controller which models an operating parameter based upon other information.

Figure 5:
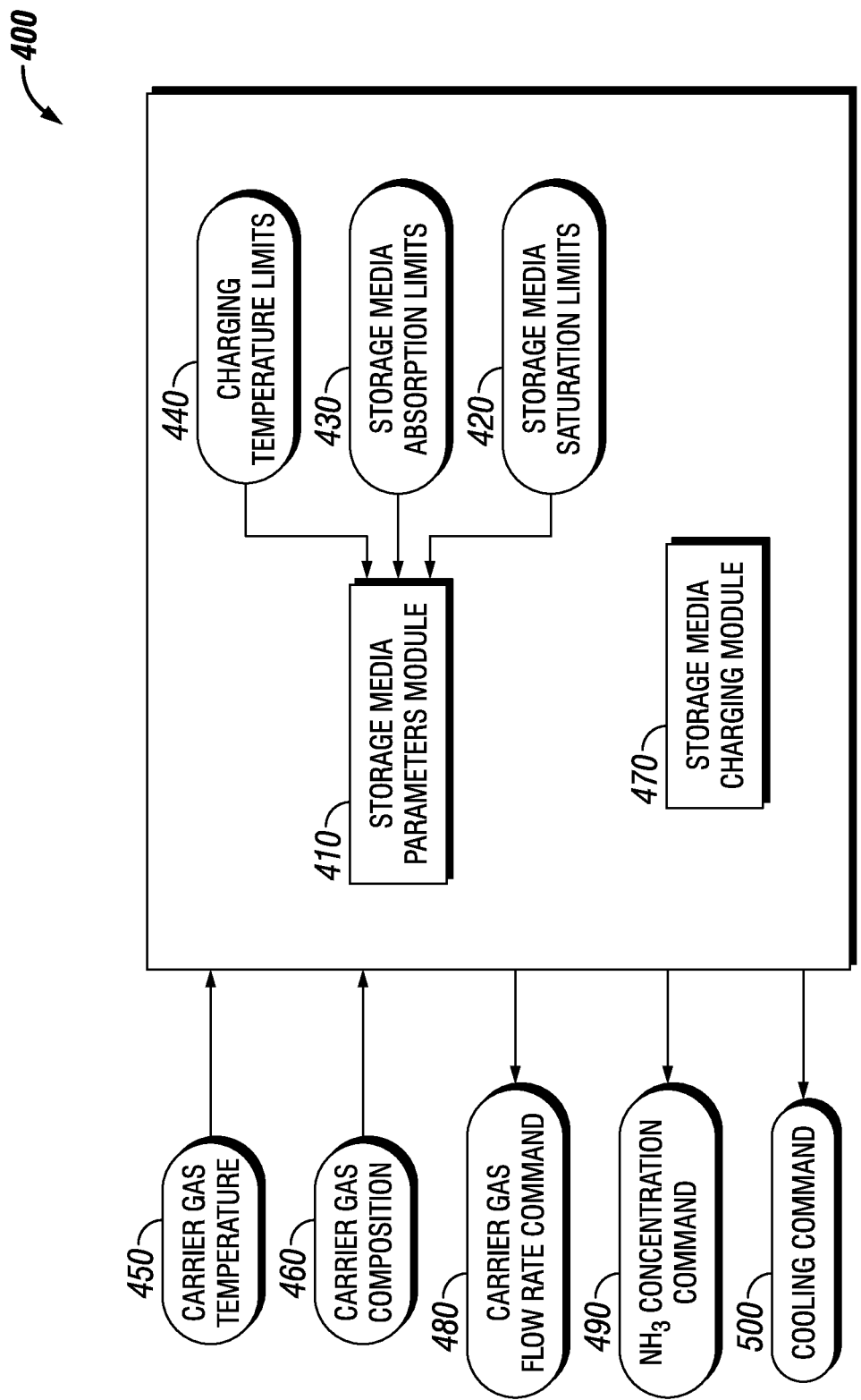
FIG. 5 is a diagram of one embodiment of a controller that functionally executes certain operations for charging a solid storage media with ammonia.

FIG. 5 represents an apparatus 400 that includes controller 150, 350 with various components illustrated as representative modules, inputs, outputs, and intermediate data parameters. According to one embodiment, the apparatus 400 includes a storage media parameters module 410 configured to determine parameters for charging storage media 160 in cartridge 110 based on, for example, the carrier gas temperature input 450 and carrier gas composition input 460. For example, the storage media parameters module 410 may be configured to determine a flow rate of carrier air and a concentration of ammonia in the carrier air to satisfy storage media saturation limits 420 and storage media absorption limits 430 while limiting the heat of cartridge 110 within acceptable limits. Storage media parameters module 410 may also be configured to determine or be programmed with acceptable temperature limits 440 for cartridge 110 and/or storage media 160 during charging of storage media 160.

Apparatus 400 also includes storage media charging module 470. Storage media charging module 470 receives the parameters for charging and/or cooling the storage media 160 from storage media parameters module 410. Based on these parameters, storage media charging module 470 determines a carrier gas flow command 480 and an ammonia concentration command 490 to control the flow of the carrier gas and the ammonia concentration of the carrier gas to storage media 160. Carrier gas flow rate command 480 can, for example, provide a signal to adjust a position of exhaust valve 200 to control the flow and/or temperature of the carrier gas. Ammonia concentration command 490 provides a signal to adjust valve 190 to control the concentration of ammonia in the carrier gas entering cartridge 110.

In one embodiment, storage media charging module 470 determines a cooling command 500 to control the flow of cooling fluid to cartridge 110 and maintain cartridge 110 within acceptable temperature limits during charging. Cooling command 500 can, for example, provide a signal to adjust a position of valves 320, 324 to control the flow and/or temperature of the cooling fluid through cooling loop 318.

The descriptions herein provide illustrative embodiments of processes for charging and/or cooling a cartridge 110 with storage media 160. Operations illustrated are understood to be exemplary only, and operations may be combined or divided, and added or removed, as well as re-ordered in whole or part. Certain operations illustrated may be implemented by a computer executing a computer program product on a computer readable medium, where the computer program product comprises instructions causing the computer to execute one or more of the operations, or to issue commands to other devices to execute one or more of the operations.

According to one aspect, a method comprises introducing into a cartridge containing a solid storage media a quantity of ammonia diluted in a carrier gas to saturate the solid storage media with ammonia. In one embodiment, the method includes controlling the heating of the solid storage media with the flow rate of the carrier gas and the concentration of ammonia in the carrier gas.

In another embodiment, the method includes storing the ammonia as an ammonium salt and introducing the quantity of ammonia includes decomposing the ammonium salt to yield ammonia gas for introduction into the carrier gas. In a refinement of this embodiment, the method includes decomposing the ammonium salt yields ammonia gas and carbon dioxide, each of which is introduced to the solid storage media. In another refinement of this embodiment, decomposing the ammonium salt yields ammonia gas and carbon dioxide, and the method includes separating the carbon dioxide from the ammonia gas before introducing the ammonia gas into the solid storage media.

According to another aspect, a method comprises introducing into a cartridge containing a spent solid storage media a quantity of ammonia sufficient to charge the solid storage media with ammonia while cooling the outside of the cartridge with a cooling system of a vehicle to which the ammonia media cartridge is mounted.

In one embodiment, the cooling system of the vehicle includes a cooling fluid circulated through a heat exchanger. In a refinement of this embodiment, during operation of the vehicle the cooling system of the vehicle is operable to heat the solid storage media in the cartridge with cooling fluid heated by the vehicle to release ammonia from the solid storage media.

According to a further aspect, a system includes an engine with a coolant system and an exhaust system. A cartridge with a solid storage media capable of absorbing and releasing a quantity of ammonia is connected to the exhaust system to provide ammonia to the exhaust system for treatment of emissions. The coolant system is configured to cool the solid storage media during charging of the storage media with ammonia.

In one embodiment, the cooling system is configured to provide cooling fluid heated by the engine to heat the solid storage media and release ammonia from the solid storage media for delivery to the exhaust. In another embodiment, the system includes a charging system for charging the solid storage media. The charging system includes a source of ammonia selectively connectable to the cartridge. In one refinement of this embodiment, the charging system includes a cooler configured to receive and cool carrier air from the cartridge during charging of the solid storage media, and a compressor configured to receive and compress cooled carrier air from the cooler. The source of ammonia is connected between the compressor and the cartridge to provide ammonia gas to the carrier air.

According to a further aspect, a method includes saturating a spent solid storage media of a cartridge with molecules; exposing the saturated storage media to a dry gas containing ammonia to displace the adsorbed molecules with ammonia so the heat of desorption of the molecules offsets the heat of adsorption of the ammonia. In one embodiment, the molecules are water molecules adsorbed from air.

According to yet another aspect, a method includes storing a compound containing ammonia in a bound form; separating the compound to obtain a stream of ammonia gas; and saturating a spent storage media of a cartridge with the ammonia gas to charge the storage media, where the cartridge is part of an exhaust treatment system.

In one embodiment, the compound with bound ammonia is ammonium carbamate and the ammonium carbamate is decomposed to yield a gas stream of ammonia and carbon dioxide which is either applied directly to the storage media, or where the ammonia is separated from the carbon dioxide before application to the storage media.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary. While the invention has been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein are desired to be protected.

What is claimed is:

1. A method, comprising:
introducing into a cartridge containing a solid storage media a quantity of gaseous ammonia diluted in a cooled carrier gas to charge the solid storage media with ammonia, wherein the cartridge is used in an exhaust aftertreatment system and the ammonia is released from the cartridge to treat exhaust gas emissions.

2. The method of claim 1, further comprising controlling heating of the storage media with the flow rate of the carrier gas and the concentration of ammonia in the carrier gas while introducing the ammonia into the cartridge.

3. The method of claim 1, further comprising storing the ammonia as an ammonium salt and introducing the quantity of ammonia includes decomposing the ammonium salt to yield ammonia gas for introduction into the carrier gas.

4. The method of claim 3, wherein decomposing the ammonium salt yields ammonia gas and carbon dioxide, each of which are introduced to the solid storage media.

5. The method of claim 3, wherein decomposing the ammonium salt yields ammonia gas and carbon dioxide, and further comprising separating the carbon dioxide from the ammonia gas before introducing the ammonia gas into the solid storage media.

6. The method of claim 3, wherein the ammonium salt is selected from the group consisting of: ammonium carbamate, ammonium carbonate, ammonium bicarbonate, and ammonium acetate.

7. A method, comprising:
introducing into a spent solid storage media contained within a storage media cartridge a quantity of ammonia sufficient to charge the solid storage media with ammonia; and
cooling the outside of the storage media cartridge with a cooling system of a vehicle to which the ammonia media cartridge is mounted while introducing the quantity of ammonia.

8. The method of claim 7, wherein the cooling system of the vehicle includes a cooling fluid circulated through a heat exchanger.

9. The method of claim 8, wherein during operation of the vehicle the cooling system of the vehicle is operable to heat the solid storage media in the cartridge with cooling fluid heated by the vehicle to release ammonia from the solid storage media.

10. The method of claim 8, wherein introducing the quantity of ammonia include introducing gaseous ammonia diluted by a carrier gas into the cartridge.

11. A method, comprising:
saturating a spent solid storage media of a storage media cartridge with molecules; and
exposing the saturated storage media to a dry gas containing ammonia to displace the adsorbed molecules with ammonia, wherein the heat of desorption of the molecules offsets the heat of adsorption of the ammonia.

12. The method of claim 11, wherein the molecules are water molecules adsorbed from air.

13. A method, comprising:
storing a compound containing ammonia in a bound form;
separating the compound to obtain a stream of ammonia gas; and
charging a spent storage media of a cartridge with the stream of ammonia gas to charge the storage media with ammonia, wherein the cartridge is part of an exhaust treatment system, wherein the ammonia gas is separated from the carbon dioxide before charging the spent storage media of the cartridge with the ammonia gas.

14. The method of claim 13, wherein the compound with bound ammonia is ammonium carbamate and the ammonium carbamate is decomposed to yield a gas stream of ammonia and carbon dioxide.

15. The method of claim 14, wherein gas stream is applied directly to the spent storage media to saturate the spent storage media with the ammonia gas.

* * * * *